United States Patent
Oien et al.

(10) Patent No.: US 9,912,902 B2
(45) Date of Patent: Mar. 6, 2018

(54) AUTOMATIC EVENT RECORDER (71) Applicant: Intel Corporation, Santa Clara, CA (US)

(72) Inventors: Benjamin Conrad Oien, Wilsonville, OR (US); Paul F. Sorenson, Hillsboro, OR (US); Kahyun Kim, Portland, OR (US); Emily N. Ivers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/971,574

(22) Filed: Dec. 16, 2015

(65) Prior Publication Data
US 2017/0180676 A1 Jun. 22, 2017

(51) Int. Cl.
H04N 5/91 (2006.01)
G06F 3/06 (2006.01)
H04N 5/44 (2011.01)
H04N 5/77 (2006.01)

(52) U.S. Cl.
CPC ............. *H04N 5/91* (2013.01); *G06F 3/0623* (2013.01); *G06F 3/0659* (2013.01); *G06F 3/0673* (2013.01); *H04N 5/4403* (2013.01); *H04N 5/772* (2013.01); *H04N 2005/4432* (2013.01)

(58) Field of Classification Search
CPC ........ H04N 5/91; H04N 5/4403; H04N 5/772; G06F 3/0623; G06F 3/0659; G06F 3/0673
USPC .................................................. 386/223, 228
See application file for complete search history.

(56) References Cited

U.S. PATENT DOCUMENTS

| 8,531,526 | B1 | 9/2013 | Spence et al. |
| 9,076,041 | B2 | 7/2015 | Bentley et al. |
| 2004/0104823 | A1 | 6/2004 | Chainer et al. |
| 2008/0042825 | A1* | 2/2008 | Denny ............... G08G 1/205 340/522 |
| 2011/0125708 | A1 | 5/2011 | Vanman et al. |
| 2012/0083237 | A1* | 4/2012 | Fish ................ H04M 1/72538 455/404.1 |

(Continued)

FOREIGN PATENT DOCUMENTS

WO    WO-2014041032 A1    3/2014

OTHER PUBLICATIONS

"International Application Serial No. PCT/US2016/061547, International Search Report dated Feb. 13, 2017", 3 pgs.

(Continued)

*Primary Examiner* — Mishawn Hunter
(74) *Attorney, Agent, or Firm* — Schwegman Lundberg & Woessner, P.A.

(57) ABSTRACT

Systems and techniques for an automatic event recorder are described herein. An input stream may be written to a memory buffer in an overwrite mode. The input stream may be received from a sensor array of a wearable device. A first portion of the input stream written to the memory buffer may be protected upon obtaining an indication of occurrence of a start event. The memory buffer may be configured to receive a second portion of the input stream in a write mode subsequent to the occurrence of the start event. The memory buffer may be reconfigured to receive a third portion of the input stream in the overwrite mode upon obtaining an indication of the occurrence of the stop event.

24 Claims, 4 Drawing Sheets

(56) References Cited

U.S. PATENT DOCUMENTS

2014/0189937 A1* 7/2014 Pietrzak ................. A42B 3/062
                                                    2/411
2014/0348484 A1* 11/2014 Erwin .................... A42B 3/042
                                                    386/223
2015/0317801 A1   11/2015 Bentley
2016/0026853 A1*  1/2016 Wexler ............... G02B 27/0093
                                                    382/103
2016/0044276 A1*  2/2016 Shearman ............ A42B 3/0426
                                                    348/207.1

OTHER PUBLICATIONS

"International Application Serial No. PCT/US2016/061547, Written Opinion dated Feb. 13, 2017", 12 pgs.

\* cited by examiner

AUTOMATIC EVENT RECORDER

BACKGROUND

Bicyclists may have little recourse if they have a collision with a vehicle. According to the Centers for Disease Control, over 900 cyclists were killed and 494,000 emergency room visits occurred due to bike accidents in 2013. Many infractions or near misses happen each day that may not be reported or recorded. Determining fault may be important when an actual infraction of the law is committed. Safety improvements may be beneficial to bicyclists as a bicyclist may be more vulnerable to injury in a collision than a motor vehicle driver.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Accidents between bicycles and automobiles generally pose a greater risk to the bicycle rider. Often times there may be little evidence of what caused a collision other than statements by a party to the accident or a witness. However, human memory may be subject to inaccuracies and may be influenced by bias or other internal or external forces. It may be difficult to determine the circumstances leading up to or subsequent to an event such as an accident without reliable information.

Systems and techniques for an automatic event recorder are disclosed herein which may provide reliable information providing the circumstances leading up to and subsequent to an event (e.g., crash, interesting visuals, happenstances, etc.). With reliable information, it may be possible enact new safety measures or establish fault. A technique utilizing sensor technology (e.g., for bike-commuting, etc.) in conjunction with a wearable device (e.g., head mounted display (HMD) glasses) and a storage device (e.g., solid-state drive (SSD) quick-access storage) may provide data surrounding events (e.g., collisions, etc.) that may be helpful in understanding the cause of the event. For example, the present subject matter may allow recording of information (e.g., location, video, audio) surrounding events when they occur.

The present subject matter may heighten awareness and attention of a user and may facilitate avoidance of incidents between bikes and vehicles. In addition, the disclosed techniques may give cyclists and drivers recourse in situations where they are often at a disadvantage in reporting accidents by providing data to inform understanding and decision making. The wearable device may include sensors such as, for example, audio microphones and video cameras to record the scene from the rider's perspective. The present subject matter may provide rider-point-of-view perspective and orientation of the camera and microphone sensors that may enable a recording event that may be near-real-time and may very relevant to an event that has just occurred.

In an example, an intelligent Head Mounted Display (HMD) device paired to a companion smartphone keeps a circular recording buffer (audio and video) for a user defined period while the cyclist is wearing the HMD. As long as no trigger events occur, buffered data older than the user defined period is discarded. By using an accelerometer, a microphone, and a video/camera sensor in conjunction with low power 'always listening' (LPAL) technologies, a series of triggers and/or events may be determined from input received such as, by way of example and not limitation, a loud crash noise, a rider's exclamation (e.g., voice, yelling loudly, swearing, etc.), and very sudden, violent stopping or quick change in orientation/motion.

The sensor data combined with the LPAL trigger mechanism may automatically cause real-time recording of location, time, audio, and video of the event. In an example, after receiving a trigger event (e.g., a start event, a stop event, etc.), the device may save the buffered video before the point of the trigger event and may continue to save ambient audio and video continuously until, for example, either a predefined storage limit is reached, the user terminates the recording, or the device stops functioning.

The buffer may constantly replace old data with new data. In an example, the buffer may be a user-defined-duration circular buffer. The circular buffer may be transparent to the user until an event occurs. At the point of the trigger event, the buffered data may be written to a second persistent storage location. In an example, the buffer may be persistent in case of hardware failure. When the device begins persistent storage of recorded data, the user may be notified via a combination of a subtle audio or a display cue. Data may continue to be persistently recorded until a predetermined stop event has occurred. Some stop events such as, for example, a custom voice event may be configured to automatically delete the recorded data.

In an example, the video clip may be saved along with other data such as, for example, GPS/location, event date and time, trigger event type, and accelerometer data. In an example, the record may be stored locally and may be backed up to a companion device (e.g., mobile phone, tablet, etc.) and/or cloud storage (e.g., public cloud storage system, private cloud storage system, etc.) upon the next connection.

In some examples, the record may be deleted in the absence of a trigger event or may be saved with presence of a trigger event for later inspection or deletion if the event turns out to be a false-positive (e.g., an accident did not occur, or a near-accident event has occurred, etc.).

Figure 1:
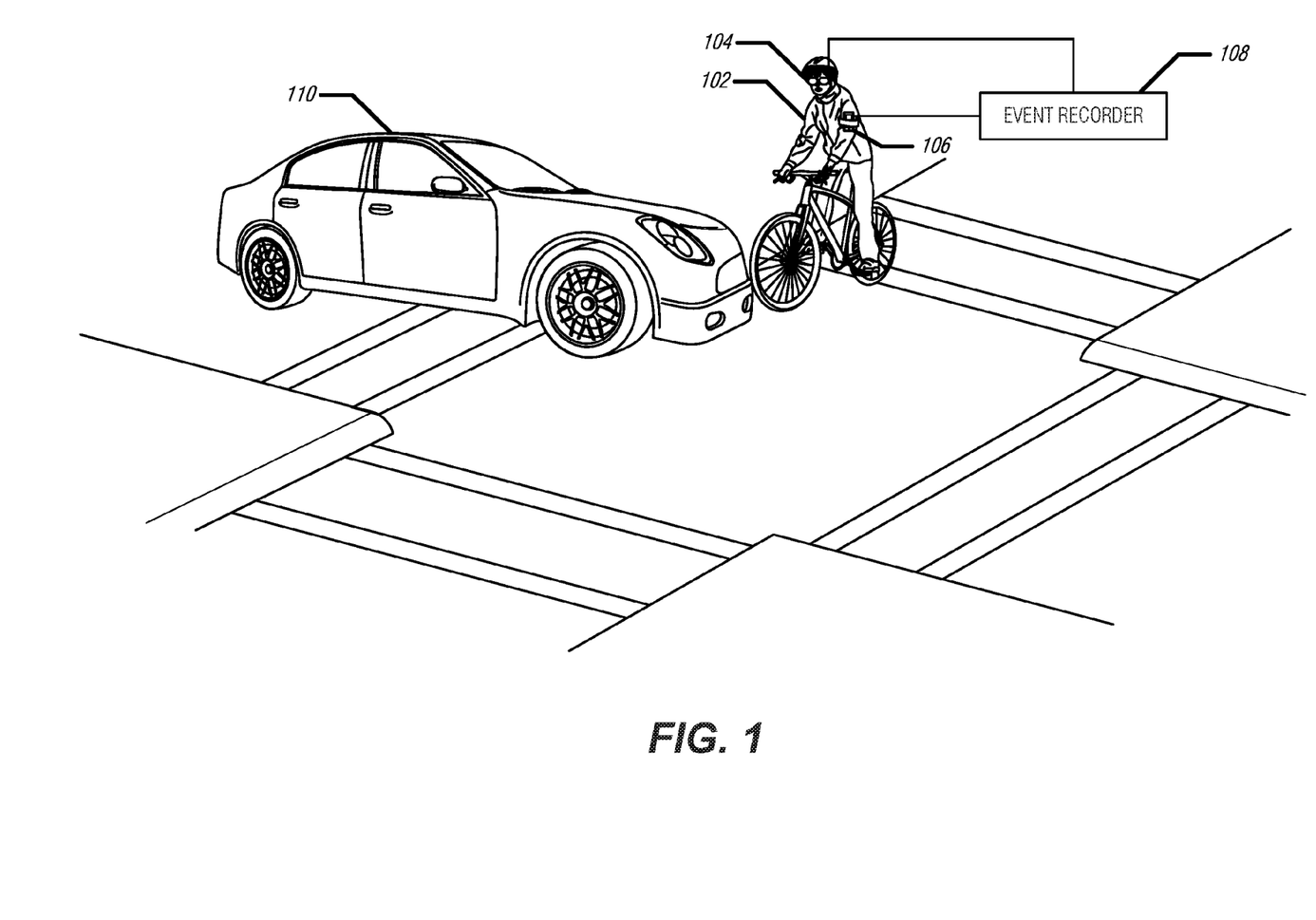
FIG. 1 illustrates an environment including an event recorder, according to an embodiment.

FIG. 1 illustrates an environment 100 including an event recorder 108, according to an embodiment. The environment 100 may include an automobile 110, and a user 102 (e.g., bicyclist, etc.). The user 102 may be wearing a wearable device 104 (e.g., smartglasses, smart watch, etc.) and may have a mobile device (e.g., smartphone, tablet, etc.) 106. The wearable device 104 and mobile device 106 may be communicatively coupled to an event recorder 108. In an example, the event recorder 108 may be integrated into the wearable device 104 and/or the mobile device 106.

The wearable device 104 may include an array of sensors (e.g., camera, microphone, accelerometer, gyroscope, magnetometer, GPS receiver, etc.) that may observe the environment surrounding the user 102. For example, the user 102 may be riding a bicycle and may come to an intersection where an automobile 110 may enter the intersection in the path of the user. The user 102 may slow rapidly and may utter a verbal exclamation. An accelerometer in the array of sensors may detect the rapid deceleration of the user 102 and a microphone of the array of sensors may detect the verbal exclamation.

The wearable device 104 may include a memory device and a storage device capable of storing data received from the array of sensors. In an example, the memory device may be a memory buffer. In an example, the memory device may be a user-defined-duration circular memory buffer. In an example, the storage device may be a solid-state drive.

The data collected from the array of sensors may be received by the event recorder 108. The event recorder 108 may write the data to the memory device of the wearable device 104. For example, the data collected by the accelerometer indicating the rapid deceleration of the user 102 and the audio of the verbal exclamation of the user may be written to the memory device.

The event recorder 108 may use the data to detect the occurrence of an event. The event recorder 108 may detect a variety of events that may be classified by event type. Example event types include, but are not limited to, a start event, a stop event, a save event, and a delete event.

A start event is an event that causes the event recorder 108 to save data collected for a period of time before the occurrence of the start event and data collected for a period of time after the occurrence of the start event. For example, the verbal exclamation of the user 102, the rapid deceleration of the user 102, or both may be used by the event recorder 108 to determine that an impending collision event has occurred which may be classified as a start event.

A stop event is an event that causes the event recorder 108 to cease the data save operations imitated subsequent to and/or simultaneously with the detection of a start event. For example, a voice command uttered by the user 102 such as "stop recording" may be classified as a stop command. In an example, event types may be further classified by sub-types. Depending on the type of stop event detected by the crash recorder 108, the data saved may be discarded. For example, a voice command uttered by the user 102 such as "delete recording" may be classified as a stop and delete event type. As another example, the stop event may cease data save operations and initiate a subsequent process, such as uploading the audio/video recording to a remote destination for data preservation. For example, a voice command uttered by the user 102 such as "save recording" may be classified as a stop and save command and the data saved may be transferred to a cloud based storage system.

The event types may be used by the event recorder 108 to perform actions on the data such as, for example, setting storage flags for data in the memory device and transferring data between the memory device and the storage device. In an example, a start event may flag data currently residing in a memory buffer and data written to the memory buffer subsequent to the start event as write protected.

In an example, a stop event may clear the write protected flag for data written to the memory buffer subsequent to the stop event. In an example, a stop and delete event may clear the write protect flag for data written subsequent to the stop and delete event and may delete data from the memory buffer prior to the stop and delete event. In an example, a stop and save event may clear the write protect flag for data written subsequent to the stop and save event and may transfer the memory buffer to the storage device.

In some examples, data written subsequent to the start event may continue to be marked as write protected until an automatic stop event is detected such as, for example, the memory buffer has reached a physical limit or the memory buffer has reach a storage limit set by the user 102. In an example, data may continue to be written to a storage device automatically when the memory buffer reaches a physical limit. In an example, the data may be written to the storage device until an automatic stop event is detected such as the storage device has reached its physical limit or a limit set by the user 102. The event recorder is described in greater detail in FIG. 2.

Figure 2:
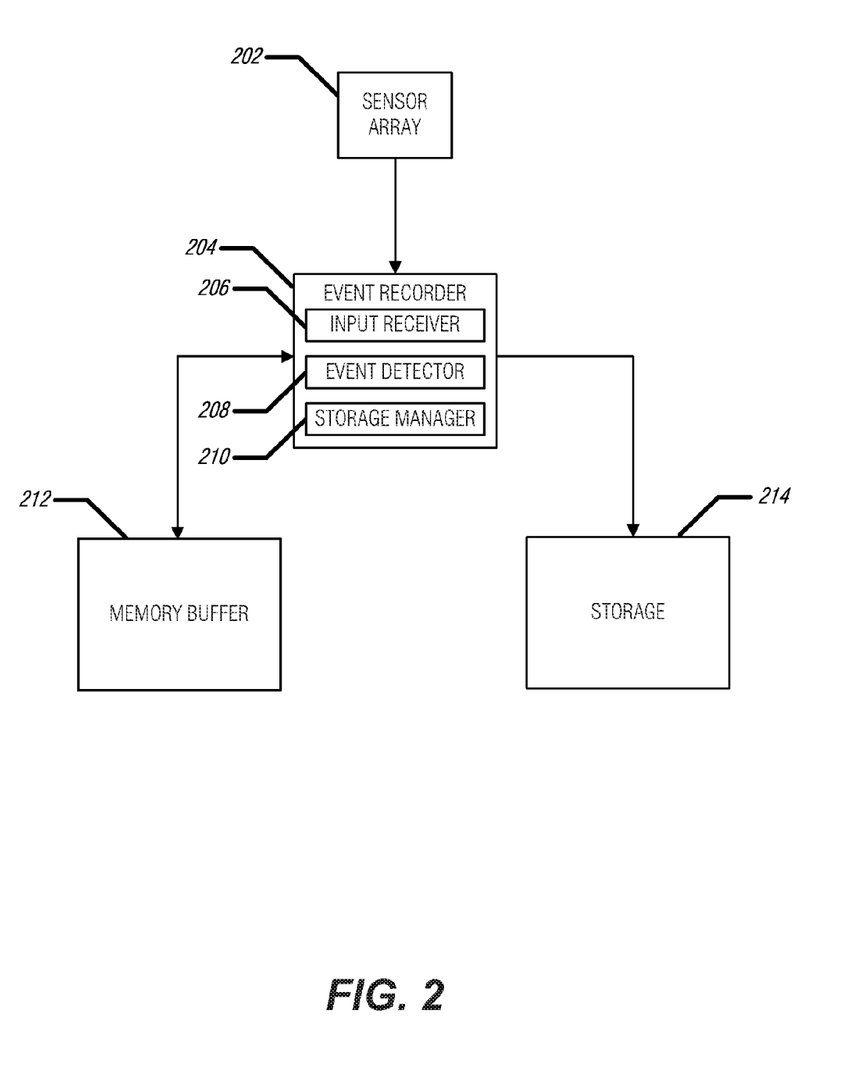
FIG. 2 illustrates an example of a system for an automatic event recorder, according to an embodiment.

FIG. 2 illustrates an example of a system 200 for an automatic event recorder, according to an embodiment. The system 200 includes a sensor array (e.g., a group of sensors integrated into a head mounted display, etc.) 202 that is communicatively coupled to an event recorder 204.

The array of sensors 202 may include various sensors including, by way of example and not limitation, a microphone, a camera, a global positioning system (GPS) receiver, accelerometer, magnetometer, gyroscope, etc. The array of sensors 202 may be used to collect information about a user and the environment surrounding the user. For example, the array of sensors 202 may observe audio, video, GPS location, and movement data corresponding with the user and the user's environment over a period of time.

The event recorder 204 may include an input receiver 206, an event detector 208, and a storage manager 210. The input receiver 206 may receive inputs from the sensor array 202. For example, the input receiver 206 may receive the audio from a microphone of the sensor array 202, video from a camera of the sensor array 202, acceleration data from an accelerometer of the sensor array 202, and GPS data from a GPS receiver of the array of sensors 202.

The data collected by the input receiver 206 from the array of sensors 202 may provide information from the user's perspective. For example, video and audio may be collected from the vantage point of the cyclist, accelerometer data collected may show impact strength as felt from the user's head, gyroscope data may show unusual positions such as a roll experienced by the user, magnetometer data collected may show the direction the user is looking, and GPS location data collected may show a point of impact, point of rest, and path of travel of the user leading up to an event.

The event detector 208 may use the data received by the input receiver 206 to make determinations about events that are occurring in the user's environment. For example, if the user is on a bicycle the event detector 208 may use received audio, video, and acceleration data to make a determination that a collision between the bicycle and another entity (e.g., vehicle, person, obstruction, etc.) is imminent. In the example, the determination may be based on received inputs indicating that the bicyclist may be yelling, the other entity may be becoming larger in the video, and the bicyclist may be slowing rapidly.

In some examples, an event may be determined using audio input received from the sensor array 202. The event detector 208 may use various techniques such as, by way of example and not limitation, computational linguistics (e.g., speech recognition, etc.) and audio event detection. In an example, the audio received from a microphone of the sensor array 202 may be processed using an algorithm to determine if units of the audio segment match models of audio segments from training data associated with an event. For example, a user may yell "Look Out!" which may be matched to an impending collision event. In another example, the audio collected from a microphone of the sensor array 202 may include the sound of screeching tires and the sound may be matched to a sound signature corresponding with the impending collision event.

In some examples, an event may be determined using video input received from the sensor array 202. The event detector 208 may use a variety of image recognition techniques to determine events occurring in the received video input. In an example, a set of training video segments may be used to create a model for an event. The received video input may then be evaluated against a set of event models to classify the received video segment with an event class. For example, a video segment received from a camera of the sensor array 202 may show a car continually getting larger throughout the clip and the video segment may be assigned an impending collision classification based on the video segments similarity to an impending collision model.

In an example, an event may be determined using accelerometer data received from the sensor array. The event detector 208 may use a variety of accelerometry techniques to determine an event has occurred. In an example, a set of training data including various acceleration and deceleration sequences may be used to generate a set of event models. The received accelerometer data may then be evaluated against the models to classify segments of the accelerometer data. For example, the received accelerometer data may indicate the user was moving at a steady pace for a period of time and then is rapidly decelerating. The segment of accelerometer may be evaluated against the set of models and may be assigned a classification of impending collision. In another example, an algorithm may be used to determine a speed variance for the segment and if the speed variance is outside a threshold it may be determined that an event has occurred. For example, the received accelerometer data may indicate the user was moving at a steady pace for a period of time and then is rapidly decelerating and the speed variance may indicate that a collision is imminent.

In some examples, received data inputs may be combined and evaluated against a set of models to determine if an event has occurred. For example, the collected audio data may indicate that the user yelled "Look Out!" and the accelerometer data may indicate there was a rapid deceleration occurring during the same time period. Using the indicia together may provide a more accurate indication of an event.

In an example, the event detector 208 may detect different classes of events. A start class of events may be used to identify data that should be saved. Examples of start events may include by example and not limitation, audible events (e.g., a volume threshold may be used to detect an impact or a car horn, etc.), custom voice events (e.g., yelling, predetermined keywords: "Watch it!" and "That was cool", etc.), common expletives, (e.g., detection of an impending event based on a dictionary of common expletives uttered in emergency situations, etc.), and data triggered events (e.g., sensor data indicates an impact or an unusual occurrence such as being upside down, etc.).

In an example, a start event may be detected that sets a write protect flag for a set of data corresponding with the start event. For example, a collision event may be detected as a start event. For example, the user may say "Look at that" which may be detected as a start event. In an example, the set of data may include data for first period of time before occurrence of the start event and data for a second period of time after the occurrence of the start event. For example, a collision start event may be determined and 30 seconds of data may be flagged for write protection and five minutes of data after the collision start event may be marked for write protection.

A stop class event may be used to end the recording and/or write protection of data collected surrounding the start event. Stop events may include automatic and/or manual indications that the event has ended and/or that the data preservation period has ended.

In an example, the event detector 208 may detect a stop event that turns off the write protect flag for data subsequent to the occurrence of the stop event. In an example, the event detector 208 may detect sub-classes of stop events. In an example, a stop and delete event may be detected that turns of the write protect flag and deletes data collected before the occurrence of the stop and delete event. In an example, a stop and save event may be detected that turns off the write protect flag and transfers the data collected before the occurrence of the stop and save event to long-term storage. Examples of stop events may include, by way of example and not limitation, physical storage limit reached, user defined storage limit reached (e.g., 1 gigabyte, etc.), user defined recording period reached (e.g., 5 minutes), user defined (e.g., through a training session) commands (e.g., "forget what just happened," "it's over," etc.), and preprogrammed commands (e.g., voice commands, gestures, etc.).

In an example, the stop event may be detected from the data collected from the sensor array 202. In an example, the sensor array 202 may include a microphone for collecting audio data and the stop event may be generated from the audio data. For example, the user may utter "stop recording" which may be classified as a stop event. In an example, the sensor array 202 may include a camera for collecting video data and the stop event may be generated from the video data. For example, the user may make a gesture with an arm that is in view of the camera. In an example, the sensor array 202 may include an accelerometer for collecting movement data and the stop event may be generated from the movement data. For example, the user may make a series of motions with his head. In an example, the sensor array 202 may include a GPS receiver for collecting location data and the stop event may be generated using the location data. For example, the user may move to a safe location.

In some examples, a combination of data collected from various sensors of the sensor array 202 may be used to generate a stop event. In an example, the stop event may be detected from the proximity of emergency personnel to the user. For example, a police officer may be detected in the video data collected which may be detected as a stop event.

The event recorder 204 may include a storage manager 210 to manage storage operations. The storage manager 210 may determine the storage location of data collected from the input receiver 206. The storage manager 210 may be communicatively coupled with a memory buffer 212 in a wearable device such as, for example, the wearable device 104 as described in FIG. 1. In an example, the memory buffer 212 may be a short-term memory storage location that is able to store streaming input data in real-time. For example, input receiver 206 may receive a data stream from the array of sensors 202 including audio, video, movement, and location data and the storage manager 210 may continuously write the data stream to the memory buffer 212. In an example, the storage manager 210 may continuously write the input data stream to the memory buffer while the event recorder 204 is in operation. In an example, a video clip may be saved along with location, event date, event time, event type, and accelerometer data.

The constant read/write cycles may be taxing on storage devices (e.g., memory buffer 212). Therefore, the storage manager 210 may automatically self-validate static memory integrity on an ongoing basis. In an example, the storage manager 210 may implement data integrity validation. In an example, a notification may be transmitted to the user indicating that the static memory has failed the data integrity validation. In an example, the notification may be a graphical user interface. In an example, the notification may be a text message. In an example, an indication that the memory buffer 212 has failed an integrity check may be detected as a stop event.

In an example, the storage manager may use the memory buffer 212 as a circular buffer and may delete and/or overwrite data in response to reaching a maximum data size threshold. In an example, the storage manager 210 may delete and/or overwrite data in response to reaching a time threshold. These techniques may prevent the need to store large amounts of data that are not relevant to an event. In an example, the storage manager 210 may write protect (e.g., mark as read-only, remove blocks from the buffer, etc.) data stored in the memory buffer 212. In an example, data stored in the memory buffer 212 occurring before the start event (e.g., 30 sec, etc.) may be write protected to prevent the data from being overwritten. In an example, the storage manager 210 may write protect data stored in the memory buffer 212 written between the occurrence of the start event and occurrence of the stop event. In an example, the storage manager 210 may configure the memory buffer 212 to store all data collected after the start event as write protected. In an example, the storage manager 210 may reconfigure the memory buffer 212 to store data collected after the occurrence of the stop event as overwriteable (e.g., remove the write protection, etc.).

The storage manager 210 may be communicatively coupled with storage 214. In an example, storage 214 may be a solid-state drive (SSD) included in a mobile device (e.g., smartphone, tablet, etc.). In an example, the storage 214 may provide long-term storage for the event recorder 204. In an example, the storage 214 may be a cloud based storage system. In an example, the storage manager 210 may move data from the memory buffer 212 to the storage 214. In an example, the data may be moved in response to the event detector 208 receiving a stop event. For example, a start event may have been detected based on the user saying "look at that" and a stop and save event may be detected based on the user saying "save video" and the data collected between the occurrence of the start event and the stop and save event may be moved by the storage manager 210 from the memory buffer 212 to the storage 214. In an example, the storage manager 210 may transfer the data stored in the memory buffer 212 during a period of time before the start event (e.g., 30 seconds, etc.) and the data stored in the memory buffer 212 during a time period between the occurrence of the start event and the occurrence of the stop event to the storage 214.

In some examples, the storage manager 210 may delete the contents of the memory buffer 212 in response to an indication of a stop and delete event. For example, the user may say "delete recording" which may be detected as a stop and delete event upon which the storage manager 210 may delete and/or clear the contents of the memory buffer 212.

In some examples, the storage manager 210 may delete and/or transfer the contents of the memory buffer 212 in response to an indication of a gesture. For example, the user make a gesture with an arm (e.g., a swipe of the arm from lower left to upper right, etc.) or head (e.g., a series of nods, etc.) that may be detected as a stop event upon which the storage manager may delete the contents of the memory buffer 212.

In some examples, the storage 214 may be included in a mobile device and the storage manager 210 may transfer the contents of the memory buffer 212 to the storage 214 upon establishing a connection with the mobile device. For example, a start event may have been detected based on a gesture made by the user and a stope event may have been made by a voice command issued by the user while the user was away from a mobile device. When the user returns home the storage manager 210 may automatically transfer the contents of the memory buffer 212 to the storage 214 when the connection to the mobile device is established. In an example, the connection between the mobile device and the wearable device may be via a wireless connection (e.g., near-field communication, WiFi, short-wavelength radio, Bluetooth, Bluetooth low energy, Ant+, near-field communication, etc.). In an example, the connection between the wearable device and the mobile device may be a wired connection (e.g., USB, etc.).

In some examples, the event recorder 204 may send data collected before occurrence of the stop event and data collected after the occurrence of the start event over a network (e.g., cellular network, WiFi, SMS, etc.). In an example, the data may be transmitted via an email message. In an example, the data may be transmitted as a text message (e.g., SMS message, etc.). This may allow the data to be sent directly to a third party (e.g., emergency personnel, family member, friend, etc.). In formation such as the user's location and an indication of an event type may assist the third party in providing assistance to the user.

While the present subject matter has been described in a wearable device, it will be understood that the subject matter described herein could be implemented in a variety of devices such as wearable devices (e.g., smartglasses, smartwatch, etc.), automobiles, sporting equipment (bicycles, scooters, etc.), motorcycles, etc. While the present subject matter has been described in the context of a bicyclist, it will be understood that the present subject matter could be used in a variety of contexts in which a person wishes to record data surrounding an event. Some examples include, by way of example and not limitation, a motorcyclist, a motorist, an action sports participant (e.g., skier, snowboarder, etc.).

Figure 3:
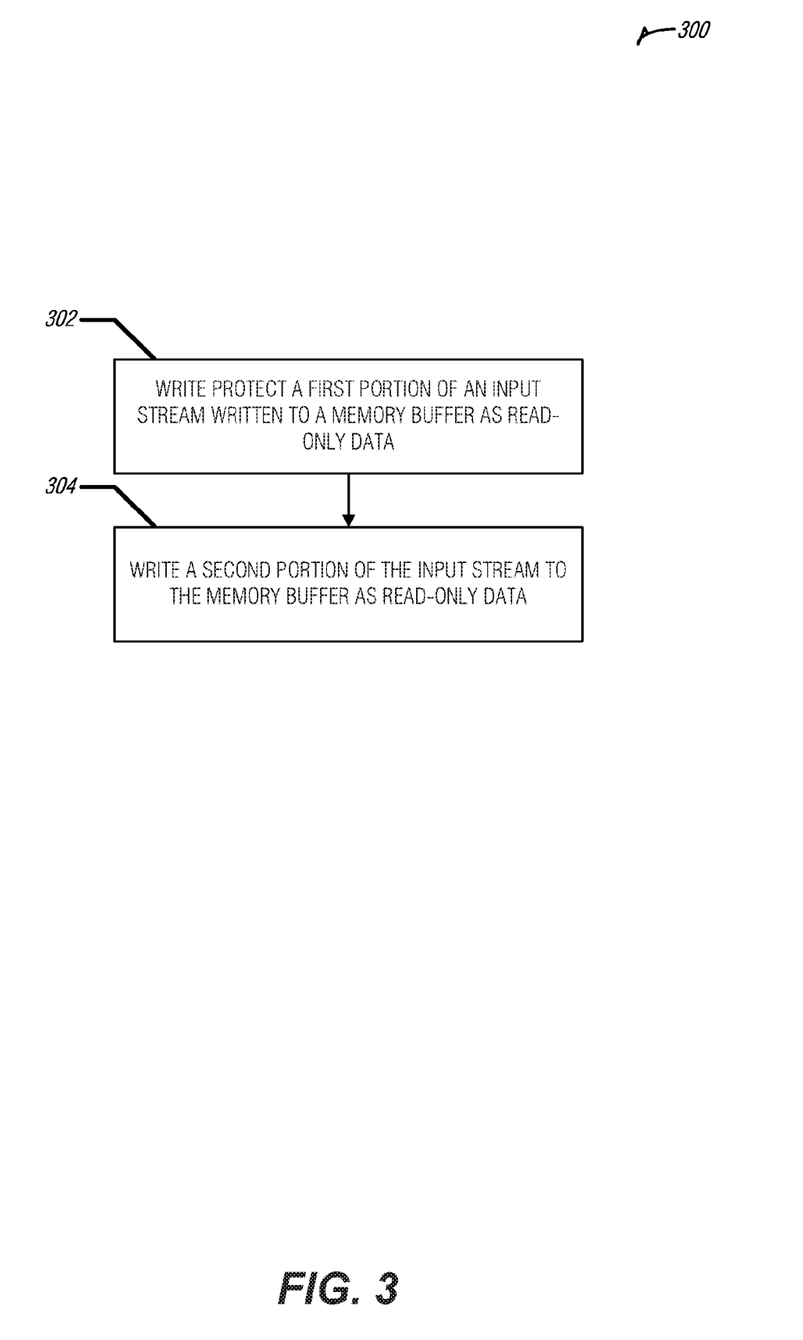
FIG. 3 illustrates an example of a method for an automatic event recorder, according to an embodiment.

FIG. 3 illustrates an example of a method 300 for an automatic event recorder, according to an embodiment.

At operation 302, method 300 may write protect a first portion of an input stream written to a memory buffer as read-only data upon receiving notification of a start event. The input stream may be received from a sensor array of a wearable device. The first portion of the input steam may correspond to a period of time before the start event. In an example, the input stream may be received from a sensor array of a wearable device. In an example, the input stream may include audio captured from a microphone of the wearable device. In an example, the input stream may include video captured from a camera of the wearable device. In an example, the input stream may include data collected from an accelerometer of the wearable device. In an example, the input stream may include data collected from a global positioning system receiver of the wearable device.

At operation 304, method 300 may write a second portion of the input stream to the memory buffer as read-only data subsequent to the start event. The second portion of the input stream may be written between the start event and a stop event. In an example, the stop event may be generated using the audio captured from the microphone of the wearable device. In an example, the stop event may be generated using the video captured from the camera of the wearable device. In an example, the stop event may be generated using the data collected from the accelerometer of the wearable device. In an example, the stop event may be generated using the data collected from the global positioning system receiver of the wearable device. In an example, the stop event may be received from the wearable device.

In some examples, audio information captured by the sensor array may be accessed, a voice command made by a user may be detected, and the stop event may be generated based on the voice command. In some examples, video information captured by the sensor array may be accessed, a gesture made by a user may be detected, and the stop event may be generated based on the gesture. In some examples, a user-defined data storage limit for the memory buffer may be accessed, it may be determined that the memory buffer has reached the user-defined storage limit, and the stop event may be generated based on the determination.

In some examples, a third portion of the input stream may be written to the memory buffer as over-writeable data upon receiving notification of the stop event. In an example, the third portion of the input stream may be written subsequent to the occurrence of the stop event.

In some examples, the first portion of the input stream written to the memory buffer and the second portion of the input stream written to the memory buffer may be transferred to a storage device upon receiving notification of the stop event. In an example, the storage device may be included in a mobile device. In an example, the storage device may be included in the wearable device. In some examples, the memory buffer may be cleared upon the receipt of the stop event.

Figure 4:
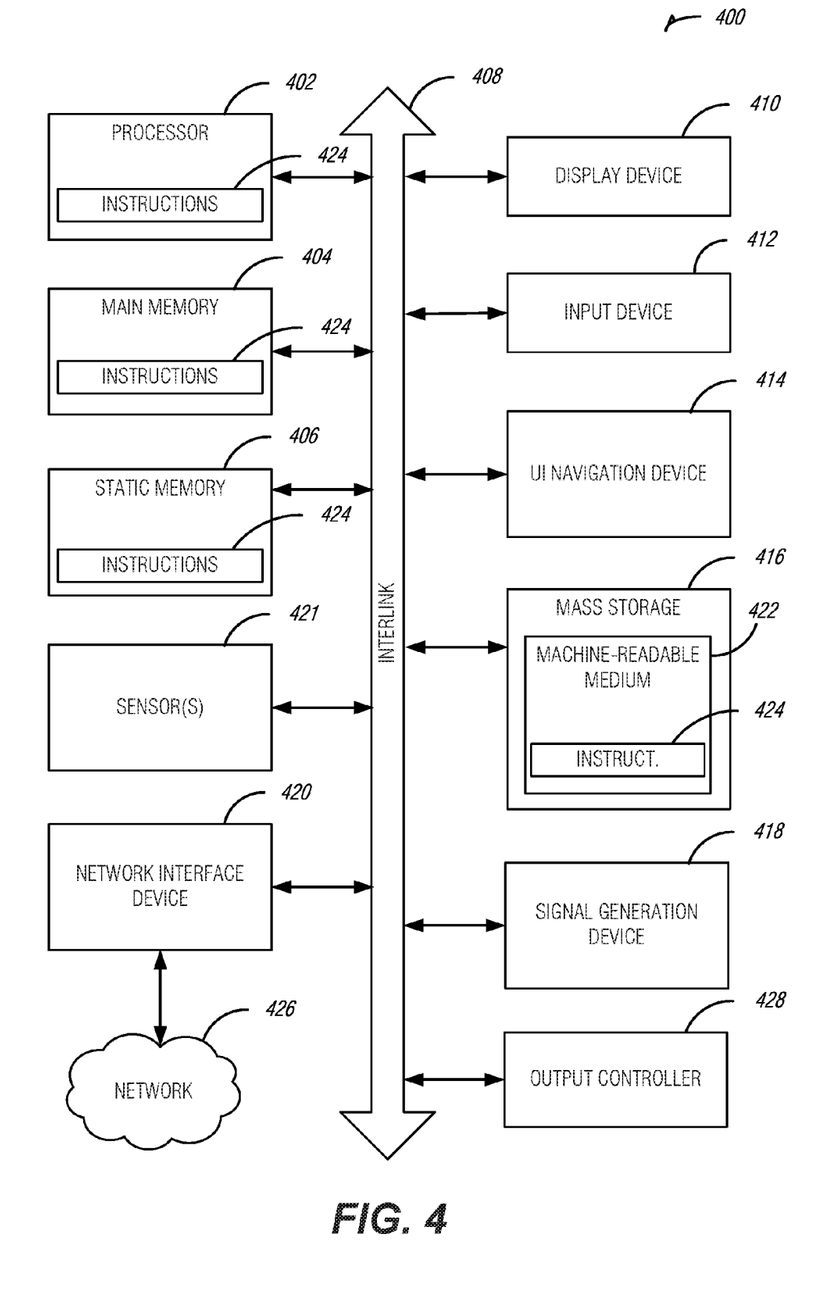
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes & Examples

Example 1 is a computing apparatus for automatic event recording, the computing apparatus comprising: a processor; and a memory storing instructions that, when executed by the processor, configure the computing apparatus to: write protect, upon receiving notification of a start event, a first portion of an input stream written to a memory buffer as read-only data, the input stream received from a sensor array of a wearable device, the first portion of the input steam corresponding to a period of time before the start event; and write, subsequent to the start event, a second portion of the input stream to the memory buffer as read-only data, the second portion of the input stream written between the start event and a stop event.

In Example 2, the subject matter of Example 1 optionally includes, wherein the input stream includes audio captured from a microphone of the wearable device.

In Example 3, the subject matter of Example 2 optionally includes, further comprising instructions, which when executed by the processor, cause the processor to generate the stop event using the audio captured from the microphone of the wearable device.

In Example 4, the subject matter of any one or more of Examples 1-3 optionally include, wherein the input stream includes video captured from a camera of the wearable device.

In Example 5, the subject matter of Example 4 optionally includes, further comprising instructions, which when executed by the processor, cause the processor to generate the stop event using the video captured from the camera of the wearable device.

In Example 6, the subject matter of any one or more of Examples 1-5 optionally include, wherein the input stream includes data collected from an accelerometer of the wearable device.

In Example 7, the subject matter of Example 6 optionally includes, further comprising instructions, which when executed by the processor, cause the processor to generate the stop event using the data collected from the accelerometer of the wearable device.

In Example 8, the subject matter of any one or more of Examples 1-7 optionally include, wherein the input stream includes data collected from a global positioning system receiver of the wearable device.

In Example 9, the subject matter of Example 8 optionally includes, further comprising instructions, which when executed by the processor, cause the processor to generate the stop event using the data collected from the global positioning system receiver of the wearable device.

In Example 10, the subject matter of any one or more of Examples 1-9 optionally include, further comprising instructions, which when executed by the processor, cause the processor to: transfer, upon receiving notification of the stop event, the first portion of the input stream written to the memory buffer and the second portion of the input stream written to the memory buffer to a storage device.

In Example 11, the subject matter of Example 10 optionally includes, wherein the storage device is included in a mobile device.

In Example 12, the subject matter of any one or more of Examples 10-11 optionally include, wherein the storage device is included in the wearable device.

In Example 13, the subject matter of any one or more of Examples 1-12 optionally include, wherein the stop event is received from the wearable device.

In Example 14, the subject matter of any one or more of Examples 1-13 optionally include, further comprising instructions, which when executed by the processor, cause the processor to clear the memory buffer upon the receipt of the stop event.

In Example 15, the subject matter of any one or more of Examples 1-14 optionally include, further comprising instructions, which when executed by the processor, cause the processor to: access audio information captured by the sensor array; detect a voice command made by a user of the computer apparatus; and generate the stop event based on the voice command.

In Example 16, the subject matter of any one or more of Examples 1-15 optionally include, further comprising instructions, which when executed by the processor, cause the processor to: access video information captured by the sensor array; detect a gesture made by a user of the computing apparatus; and generate the stop event based on the gesture.

In Example 17, the subject matter of any one or more of Examples 1-16 optionally include, further comprising instructions, which when executed by the processor, cause the processor to: access a user-defined data storage limit for the memory buffer; determine that the memory buffer has reached the user-defined storage limit; and generate the stop event based on the determination.

In Example 18, the subject matter of any one or more of Examples 1-17 optionally include, further comprising instructions, which when executed by the processor, cause the processor to: write, upon receiving notification of the stop event, a third portion of the input stream to the memory buffer as over-writeable data.

Example 19 is a computer-readable storage medium for automatic event recording, the computer-readable storage medium including instructions that when executed by a computer, cause the computer to: write protect, upon receiving notification of a start event, a first portion of an input stream written to a memory buffer as read-only data, the input stream received from a sensor array of a wearable device, the first portion of the input steam corresponding to a period of time before the start event; and write, subsequent to the start event, a second portion of the input stream to the memory buffer as read-only data, the second portion of the input stream written between the start event and a stop event.

In Example 20, the subject matter of Example 19 optionally includes, wherein the input stream includes audio captured from a microphone of the wearable device.

In Example 21, the subject matter of Example 20 optionally includes, further comprising instructions to cause the computer to generate the stop event using the audio captured from the microphone of the wearable device.

In Example 22, the subject matter of any one or more of Examples 19-21 optionally include, wherein the input stream includes video captured from a camera of the wearable device.

In Example 23, the subject matter of Example 22 optionally includes, further comprising instructions to cause the computer to generate the stop event using the video captured from the camera of the wearable device.

In Example 24, the subject matter of any one or more of Examples 19-23 optionally include, wherein the input stream includes data collected from an accelerometer of the wearable device.

In Example 25, the subject matter of Example 24 optionally includes, further comprising instructions to cause the computer to generate the stop event using the data collected from the accelerometer of the wearable device.

In Example 26, the subject matter of any one or more of Examples 19-25 optionally include, wherein the input stream includes data collected from a global positioning system receiver of the wearable device.

In Example 27, the subject matter of Example 26 optionally includes, further comprising instructions to cause the computer to generate the stop event using the data collected from the global positioning system receiver of the wearable device.

In Example 28, the subject matter of any one or more of Examples 19-27 optionally include, further comprising instructions to cause the computer to: transfer, upon receiving notification of the stop event, the first portion of the input stream written to the memory buffer and the second portion of the input stream written to the memory buffer to a storage device.

In Example 29, the subject matter of Example 28 optionally includes, wherein the storage device is included in a mobile device.

In Example 30, the subject matter of any one or more of Examples 28-29 optionally include, wherein the storage device is included in the wearable device.

In Example 31, the subject matter of any one or more of Examples 19-30 optionally include, wherein the stop event is received from the wearable device.

In Example 32, the subject matter of any one or more of Examples 19-31 optionally include, further comprising instructions to cause the computer to clear the memory buffer upon the receipt of the stop event.

In Example 33, the subject matter of any one or more of Examples 19-32 optionally include, further comprising instructions to cause the computer to: access audio information captured by the sensor array; detect a voice command made by a user of the computer; and generate the stop event based on the voice command.

In Example 34, the subject matter of any one or more of Examples 19-33 optionally include, further comprising instructions to cause the computer to: access video information captured by the sensor array; detect a gesture made by a user of the computer; and generate the stop event based on the gesture.

In Example 35, the subject matter of any one or more of Examples 19-34 optionally include, further comprising instructions to cause the computer to: access a user-defined data storage limit for the memory buffer; determine that the memory buffer has reached the user-defined storage limit; and generate the stop event based on the determination.

In Example 36, the subject matter of any one or more of Examples 19-35 optionally include, further comprising instructions to cause the computer to: write, upon receiving notification of the stop event, a third portion of the input stream to the memory buffer as over-writeable data.

Example 37 is a system for automatic event recording, the system comprising: means for write protecting, upon receiving notification of a start event, a first portion of an input stream written to a memory buffer as read-only data, the input stream received from a sensor array of a wearable device, the first portion of the input steam corresponding to a period of time before the start event; and means for writing, subsequent to the start event, a second portion of the input stream to the memory buffer as read-only data, the second portion of the input stream written between the start event and a stop event.

In Example 38, the subject matter of Example 37 optionally includes, wherein the input stream includes audio captured from a microphone of the wearable device.

In Example 39, the subject matter of Example 38 optionally includes, further comprising means for generating the stop event using the audio captured from the microphone of the wearable device.

In Example 40, the subject matter of any one or more of Examples 37-39 optionally include, wherein the input stream includes video captured from a camera of the wearable device.

In Example 41, the subject matter of Example 40 optionally includes, further comprising means for generating the stop event using the video captured from the camera of the wearable device.

In Example 42, the subject matter of any one or more of Examples 37-41 optionally include, wherein the input stream includes data collected from an accelerometer of the wearable device.

In Example 43, the subject matter of Example 42 optionally includes, further comprising means for generating the stop event using the data collected from the accelerometer of the wearable device.

In Example 44, the subject matter of any one or more of Examples 37-43 optionally include, wherein the input stream includes data collected from a global positioning system receiver of the wearable device.

In Example 45, the subject matter of Example 44 optionally includes, further comprising means for generating the stop event using the data collected from the global positioning system receiver of the wearable device.

In Example 46, the subject matter of any one or more of Examples 37-45 optionally include, further comprising: means for transferring, upon receiving notification of the stop event, the first portion of the input stream written to the memory buffer and the second portion of the input stream written to the memory buffer to a storage device.

In Example 47, the subject matter of Example 46 optionally includes, wherein the storage device is included in a mobile device.

In Example 48, the subject matter of any one or more of Examples 46-47 optionally include, wherein the storage device is included in the wearable device.

In Example 49, the subject matter of any one or more of Examples 37-48 optionally include, wherein the stop event is received from the wearable device.

In Example 50, the subject matter of any one or more of Examples 37-49 optionally include, further comprising means for clearing the memory buffer upon the receipt of the stop event.

In Example 51, the subject matter of any one or more of Examples 37-50 optionally include, further comprising: means for accessing audio information captured by the sensor array; means for detecting a voice command made by a user of the system; and means for generating the stop event based on the voice command.

In Example 52, the subject matter of any one or more of Examples 37-51 optionally include, further comprising: means for accessing video information captured by the sensor array; means for detecting a gesture made by a user of the system; and means for generating the stop event based on the gesture.

In Example 53, the subject matter of any one or more of Examples 37-52 optionally include, further comprising: means for accessing a user-defined data storage limit for the memory buffer; means for determining that the memory buffer has reached the user-defined storage limit; and means for generating the stop event based on the determination.

In Example 54, the subject matter of any one or more of Examples 37-53 optionally include, further comprising: means for writing, upon receiving notification of the stop event, a third portion of the input stream to the memory buffer as over-writeable data.

Example 55 is a method for automatic event recording, the method comprising: write protecting, upon receiving notification of a start event, a first portion of an input stream written to a memory buffer as read-only data, the input stream received from a sensor array of a wearable device, the first portion of the input steam corresponding to a period of time before the start event; and writing, subsequent to the start event, a second portion of the input stream to the memory buffer as read-only data, the second portion of the input stream written between the start event and a stop event.

In Example 56, the subject matter of Example 55 optionally includes, wherein the input stream includes audio captured from a microphone of the wearable device.

In Example 57, the subject matter of Example 56 optionally includes, further comprising generating the stop event using the audio captured from the microphone of the wearable device.

In Example 58, the subject matter of any one or more of Examples 55-57 optionally include, wherein the input stream includes video captured from a camera of the wearable device.

In Example 59, the subject matter of Example 58 optionally includes, further comprising generating the stop event using the video captured from the camera of the wearable device.

In Example 60, the subject matter of any one or more of Examples 55-59 optionally include, wherein the input stream includes data collected from an accelerometer of the wearable device.

In Example 61, the subject matter of Example 60 optionally includes, further comprising generating the stop event using the data collected from the accelerometer of the wearable device.

In Example 62, the subject matter of any one or more of Examples 55-61 optionally include, wherein the input stream includes data collected from a global positioning system receiver of the wearable device.

In Example 63, the subject matter of Example 62 optionally includes, further comprising generating the stop event using the data collected from the global positioning system receiver of the wearable device.

In Example 64, the subject matter of any one or more of Examples 55-63 optionally include, further comprising: transferring, upon receiving notification of the stop event, the first portion of the input stream written to the memory buffer and the second portion of the input stream written to the memory buffer to a storage device.

In Example 65, the subject matter of Example 64 optionally includes, wherein the storage device is included in a mobile device.

In Example 66, the subject matter of any one or more of Examples 64-65 optionally include, wherein the storage device is included in the wearable device.

In Example 67, the subject matter of any one or more of Examples 55-66 optionally include, wherein the stop event is received from the wearable device.

In Example 68, the subject matter of any one or more of Examples 55-67 optionally include, further comprising clearing the memory buffer upon the receipt of the stop event.

In Example 69, the subject matter of any one or more of Examples 55-68 optionally include, further comprising: accessing audio information captured by the sensor array; detecting a voice command made by a user; and generate the stop event based on the voice command.

In Example 70, the subject matter of any one or more of Examples 55-69 optionally include, further comprising: accessing video information captured by the sensor array; detecting a gesture made by a user; and generating the stop event based on the gesture.

In Example 71, the subject matter of any one or more of Examples 55-70 optionally include, further comprising: accessing a user-defined data storage limit for the memory buffer; determining that the memory buffer has reached the user-defined storage limit; and generating the stop event based on the determination.

In Example 72, the subject matter of any one or more of Examples 55-71 optionally include, further comprising: writing, upon receiving notification of the stop event, a third portion of the input stream to the memory buffer as over-writeable data.

Example 73 is a system for automatic event recording, the system comprising means to perform any method of Examples 55-72.

Example 74 is a machine readable medium for automatic event recording, the machine readable medium including instructions that, when executed by a machine, cause the machine to perform any method of Examples 55-72.

What is claimed is:

1. An automatic event recorder, comprising: a processor; and a memory storing instructions that, when executed by the processor, configure the computing apparatus to: detect occurrence of an event classified by an event type, the event type including at least one of a start event, a stop event, a save event, or a delete event, wherein instructions to detect an event type of start event include instructions to recognize a verbal exclamation of a user, an audible volume threshold, sensor data from one or more sensors indicating an impact or unusual occurrence, and a rapid deceleration of the user; automatically write protect, upon receiving notification of a start event, a first portion of an input stream written to a memory buffer as read-only data, the input stream received from a sensor array of a wearable device, the first portion of the input stream corresponding to a period of time before the start event; and write, subsequent to the start event, a second portion of the input stream to the memory buffer as read-only data, the second portion of the input stream written between the start event and a stop event.

2. The automatic event recorder of claim 1, wherein the input stream includes audio captured from a microphone of the wearable device.

3. The automatic event recorder of claim 2, further comprising instructions, which when executed by the processor, cause the processor to generate the stop event using the audio captured from the microphone of the wearable device.

4. The automatic event recorder of claim 1, further comprising instructions, which when executed by the processor, cause the processor to:
transfer, upon receiving notification of the stop event, the first portion of the input stream written to the memory buffer and the second portion of the input stream written to the memory buffer to a storage device.

5. The automatic event recorder of claim 1, further comprising instructions, which when executed by the processor, cause the processor to clear the memory buffer upon the receipt of the stop event.

6. The automatic event recorder of claim 1, further comprising instructions, which when executed by the processor, cause the processor to:
access audio information captured by the sensor array;
detect a voice command made by a user of the computer apparatus; and
generate the stop event based on the voice command.

7. The automatic event recorder of claim 1, further comprising instructions, which when executed by the processor, cause the processor to:
access video information captured by the sensor array;
detect a gesture made by a user of the computing apparatus; and
generate the stop event based on the gesture.

8. The automatic event recorder of claim 1, further comprising instructions, which when executed by the processor, cause the processor to:
access a user-defined data storage limit for the memory buffer;
determine that the memory buffer has reached the user-defined storage limit; and
generate the stop event based on the determination.

9. A non-transitory computer-readable storage medium for automatic event recording, the computer-readable storage medium including instructions that when executed by a computer, cause the computer to: detect occurrence of an event classified by an event type, the event type including at least one of a start event, a stop event, a save event, or a delete event, wherein instructions to detect an event type of start event include instructions to recognize a verbal exclamation of a user, an audible volume threshold, sensor data from one or more sensors indicating an impact or unusual occurrence, and a rapid deceleration of the user; automatically write protect, upon receiving notification of a start event, a first portion of an input stream written to a memory buffer as read-only data, the input stream received from a sensor array of a wearable device, the first portion of the input stream corresponding to a period of time before the start event; and write, subsequent to the start event, a second portion of the input stream to the memory buffer as read-only data, the second portion of the input stream written between the start event and a stop event.

10. The non-transitory computer-readable storage medium of claim 9, wherein the input stream includes audio captured from a microphone of the wearable device.

11. The non-transitory computer-readable storage medium of claim 10, further comprising instructions to cause the computer to generate the stop event using the audio captured from the microphone of the wearable device.

12. The non-transitory computer-readable storage medium of claim 9, further comprising instructions to cause the computer to:
transfer, upon receiving notification of the stop event, the first portion of the input stream written to the memory buffer and the second portion of the input stream written to the memory buffer to a storage device.

13. The non-transitory computer-readable storage medium of claim 9, further comprising instructions to cause the computer to clear the memory buffer upon the receipt of the stop event.

14. The non-transitory computer-readable storage medium of claim 9, further comprising instructions to cause the computer to:
access audio information captured by the sensor array;
detect a voice command made by a user of the computer; and
generate the stop event based on the voice command.

15. The non-transitory computer-readable storage medium of claim 9, further comprising instructions to cause the computer to:
access video information captured by the sensor array;
detect a gesture made by a user of the computer; and
generate the stop event based on the gesture.

16. The non-transitory computer-readable storage medium of claim 9, further comprising instructions to cause the computer to:
access a user-defined data storage limit for the memory buffer;
determine that the memory buffer has reached the user-defined storage limit; and
generate the stop event based on the determination.

17. A method for automatic event recording, the method comprising: detecting occurrence of an event classified by an event type, the event type including at least one of a start event, a stop event, a save event, or a delete event, wherein the detecting of a start event includes recognizing an exclamation of a user, an audible volume threshold, sensor data from one or more sensors indicating an impact or unusual occurrence, and a rapid deceleration of the user; automatically write protecting, upon receiving notification of a start event, a first portion of an input stream written to a memory buffer as read-only data, the input stream received from a sensor array of a wearable device, the first portion of the input stream corresponding to a period of time before the start event; and writing, subsequent to the start event, a second portion of the input stream to the memory buffer as read-only data, the second portion of the input stream written between the start event and a stop event.

18. The method of claim 17, wherein the input stream includes audio captured from a microphone of the wearable device.

19. The method of claim 18, further comprising generating the stop event using the audio captured from the microphone of the wearable device.

20. The method of claim 17, further comprising:
transferring, upon receiving notification of the stop event, the first portion of the input stream written to the memory buffer and the second portion of the input stream written to the memory buffer to a storage device.

21. The method of claim 17, further comprising clearing the memory buffer upon the receipt of the stop event.

22. The method of claim 17, further comprising:
accessing audio information captured by the sensor array;
detecting a voice command made by a user; and
generate the stop event based on the voice command.

23. The method of claim 17, further comprising:
accessing video information captured by the sensor array;
detecting a gesture made by a user; and
generating the stop event based on the gesture.

24. The method of claim 17, further comprising:
accessing a user-defined data storage limit for the memory buffer;
determining that the memory buffer has reached the user-defined storage limit; and
generating the stop event based on the determination.

\* \* \* \* \*